United States Patent [19]

Vlahos

[11] 4,344,085
[45] Aug. 10, 1982

[54] COMPREHENSIVE ELECTRONIC COMPOSITING SYSTEM

[75] Inventor: Petro Vlahos, Tarzana, Calif.

[73] Assignee: Vlahos-Gottschalk Research Corp., Reseda, Calif.

[21] Appl. No.: 212,971

[22] Filed: Dec. 4, 1980

[51] Int. Cl.³ ............................................ H04N 9/535
[52] U.S. Cl. .................................................... 358/22
[58] Field of Search ....................... 358/22, 40, 81, 82, 358/183

[56]  References Cited
U.S. PATENT DOCUMENTS

| | | | |
|---|---|---|---|
| 3,595,987 | 7/1971 | Vlahos | 358/22 |
| 3,778,542 | 12/1973 | Hanseman | 358/22 |
| 4,007,487 | 2/1977 | Vlahos | 358/22 |
| 4,100,569 | 7/1978 | Vlahos | 358/22 |

Primary Examiner—Robert L. Richardson
Attorney, Agent, or Firm—Poms, Smith, Lande & Rose

[57] ABSTRACT

The linear foreground and background compositing system of the "blue-screen" type and as included in my prior U.S. Pat. No. 4,100,569, is provided with non-linear background control signals for improved composite picture quality under various adverse circumstances. More particularly, the problem of footprints, scuff marks, and dust on the "blue-screen" background for the foreground signal has been eliminated by a "clean-up" circuit 98 which shifts the background signal to "fully on" when it reaches a level in the vicinity of 80 or 90 percent "on", and making a concurrent reduction in the foreground signals, so that above the selected control level shadows or semi-transparency objects are made fully transparent and are not reproduced. The problem of "print-through" in the case of glossy black objects has been avoided by a circuit 34 which reduces background signal to zero when the level of blue foreground signals drops below a predetermined level. The problem of shadow inversion and high noise level which may arise when foreground objects are subject to back lighting has been solved by the use of a dual control signal, one operating in the blue backing area, and the second operating in the subject area, see FIG. 2, AND gate 66 and potentiometer R-7. An improved single control for increasing or decreasing the intensity of shadows provides a continuously variable shadow control for bowing the background signal level characteristic, either upward or downward throughout its complete control range, see FIGS. 4 and 5. Special circuitry 32 is also provided for accommodating black background, or white backgrounds, so that special effects involving black backgrounds, or foreground cartoon pictures having white background may be easily handled.

33 Claims, 7 Drawing Figures

COMPREHENSIVE ELECTRONIC COMPOSITING SYSTEM

BACKGROUND OF THE INVENTION

The present invention relates to improved apparatus for the combining of foreground and background scenes for motion picture or television purposes, and particularly relates to the so-called "blue-screen" or special background color screen systems.

My prior U.S. Pat. No. 4,100,569, granted July 11, 1978, discloses an electronic circuit for combining foreground and background pictures substantially linearly, and included special arrangements for accommodating objects including both blue and magenta colors in the foreground. The system as described in the above-identified patent has outstanding characteristics in the merging of foreground and background pictures through a wide range of transparency of the foreground objects. In addition to the normal type of transparent foreground images, including smoke, glasses, and the like, the edges of moving objects should also be shown as being partially transparent to provide the proper illusion of rapid movement. However, certain problems have been encountered in the everyday usage of the prior system, and some of these problems are enumerated below:

One problem has been caused by black glossy objects in the foreground scene. More specifically, these dark glossy objects tend to reflect the backing color (normally blue) and therefore fail to "matte" or fail to become opaque in the composite picture, with the result that some portion of the background color "prints through" in this area of the composite picture. In certain other cases where the foreground picture requires back-lighting, for example, the glare produces shadow inversion and high levels of noise. Another important problem involves scuff marks and footprints on the blue floor forming part of the foreground scene and which has caused undesired effects on the composite photograph.

It is often desired to have special shadow effects in a moving picture, and either have shadows intensified, or substantially eliminated. In my prior U.S. Pat. No. 4,100,569 mentioned above, the shadow controls were relatively complex, and it proved to be somewhat difficult to learn how to effectively manipulate them. Accordingly, it would be desirable to have a single control knob for shadow effects. Other special conditions which require special handling include black backgrounds and white backgrounds. In the case of black backgrounds, the prior circuitry was unable to effectively handle partial transparency situations; and in the case of cartoons, instead of using a simple white paper background for the cartoons, it has previously been necessary to prepare the cartoons on transparent sheets, and this is more difficult and time-consuming than preparing cartoons on conventional white paper.

The principal object of the present invention is to provide an improved comprehensive compositing system which effectively solves or eliminates the problems and provides the additional capabilities outlined hereinabove, in an effective and relatively simple manner.

SUMMARY OF THE INVENTION

Viewed from a broad standpoint, the present invention involves the modification of the linear background control signal as developed in my prior patent cited above, to form a non-linear or mixed linear/non-linear background control signal which effectively eliminates or solves the problems identified hereinabove.

One of the more important developments of the present invention is the "clean-up" circuit which eliminates problems caused by footprints, dust, and dirt on the "blue-screen" floor or other single color backing for the foreground scene, by modifying the basic linear background control signal by using a dual control signal. The normal linear control signal operates over the entire picture in the normal manner. The second control signal is generated by amplifying the linear control signal and inserting it back into the control circuits via a linear OR gate. Thus, any selected level of the background control signal $E_c$ below 100 percent may be raised to 100 percent without infuencing the lower levels of $E_c$. At a background control voltage level of perhaps 80 percent or 90 percent of the full background picture intensity, it may be abruptly increased to 100 percent. Above this selected level, any semi-transparency object, (for example the undesired footprint) is made fully transparent and is not reproduced. Further, while the foregoing signals are reduced to zero at this point, the background scene turn-on signal is raised to full intensity levels. This has the interesting collateral effect that thin wires which may be employed to support foreground objects may be rendered invisible, along with the undesired footprints and dust.

In the area of shadow control, a single potentiometer with a center tap may have the center tap directly connected to the unmodified background control signal, and separate logic circuits connected to the top and bottom of the output potentiometer provide increased and decreased shadow effects throughout the entire range of intensity provided by the background control signals. By shifting the wiper arm on the output potentiometer from the center toward one end of the potentiometer, darker than normal shadows may be achieved, and by moving it in the opposite direction lighter than normal shadows or the elimination of shadows may be obtained. The logic circuits for increasing or decreasing shadow density include multiplication and summation circuitry.

The problem of glare from back-lighted foreground scenes involves the increased noise and the shadow inversion which often accompany this common lighting practice. The solution is to provide a dual background control signal, one being proportional to a linear function of the selected backing color alone (usually blue). This control signal is operational throughout all of the unobscured backing area. The second (and noisy) control signal is operational in the subject area in which control signal noise is not visible.

The special "black logic" composites foreground scenes photographed against a black backing. Its R.G.B. (red, green, blue) level controls permit the selection of each color's reflectivity coefficient and the setting of a specific percentage reflectivity that will be recognized as opaque. All levels of intensity or brightness of that color that are below the selected level become linearly transparent, with full transparency occurring at zero reflectivity. This "Black Logic" feature permits the compositing of "streak" photography in which the streaks are transparent. By employing a linear OR gate, all colors may be accommodated simultaneously. As the intensity of a selected color is progressively reduced, the background scene gradually comes in.

On the other hand, the "white logic" to permit the drawing of cartoons on white paper uses an "AND" gate where the lowest of the "normalized" input foreground color signals controls the turn-on of the background signal. Further, even when a small deviation from white occurs, or when a pastel shade is present, the background signals are turned off in view of the high gain which is provided.

In summary, the present improved comprehensive electronic compositing system has solved many of the problems which arose in the course of the full implementation of the system as described in my prior U.S. Pat. No. 4,100,569; and this has been accomplished by the introduction of appropriate non-linear or mixed linear/non-linear control of the background signals, as well as by the other circuits as described herein.

Other objects, features and advantages of the invention will become apparent from a consideration of the following detailed description and from the accompanying drawings.

DETAILED DESCRIPTION

Initially, in connection with the present detailed description and the showings of the present drawings, reference is made to my prior U.S. Pat. No. 4,100,569 granted July 11, 1978 in which a detailed full circuit diagram and description is set forth. The present description will assume a general knowledge of that prior circuit by way of background, and hereby incorporates that prior disclosure in the present case by reference. The present description will primarily focus on improvements in the circuitry which overcome the problems mentioned hereinabove.

Concerning the logic circuits employed in the present case, reference will frequently be made to "AND" and to "OR" circuits. These terms are widely used in the digital electronics fields, and a linear AND circuit is one which gives an output signal when all of several input signals are present; and a linear OR circuit provides an output signal when any one of the signals is present. As applied to continuously variable signals, of the type with which we are concerned in the present case, an AND circuit provides an output equal to the lowest of the various input signals, assuming a positive signal system and a positive AND gate, and in the case of an OR gate, the output is the highest of the input signals. Further, in this type of logic circuitry, negative going signals may be used with negative AND gates and negative OR gates, as well as positive logic; and in many cases where there is a logical inversion of signals from positive to negative in the course of amplification or by the logic circuitry, a single system may include some positive logic and some negative logic. Of course, all of this is well known to the logic circuit designer, and does not, per se, form any part of the present invention. However, in view of the prior full and complete disclosure in U.S. Pat. No. 4,100,569 and the well-known principles of logic circuit design, and the performance of logic elements, such as multipliers and operational amplifiers, or op-amps, the individual circuits which are set forth in the present case will be described in a moderately summary manner, and emphasis will be placed on the systems aspects of the invention and upon the equations or functions these circuits implement.

Figure 1A:
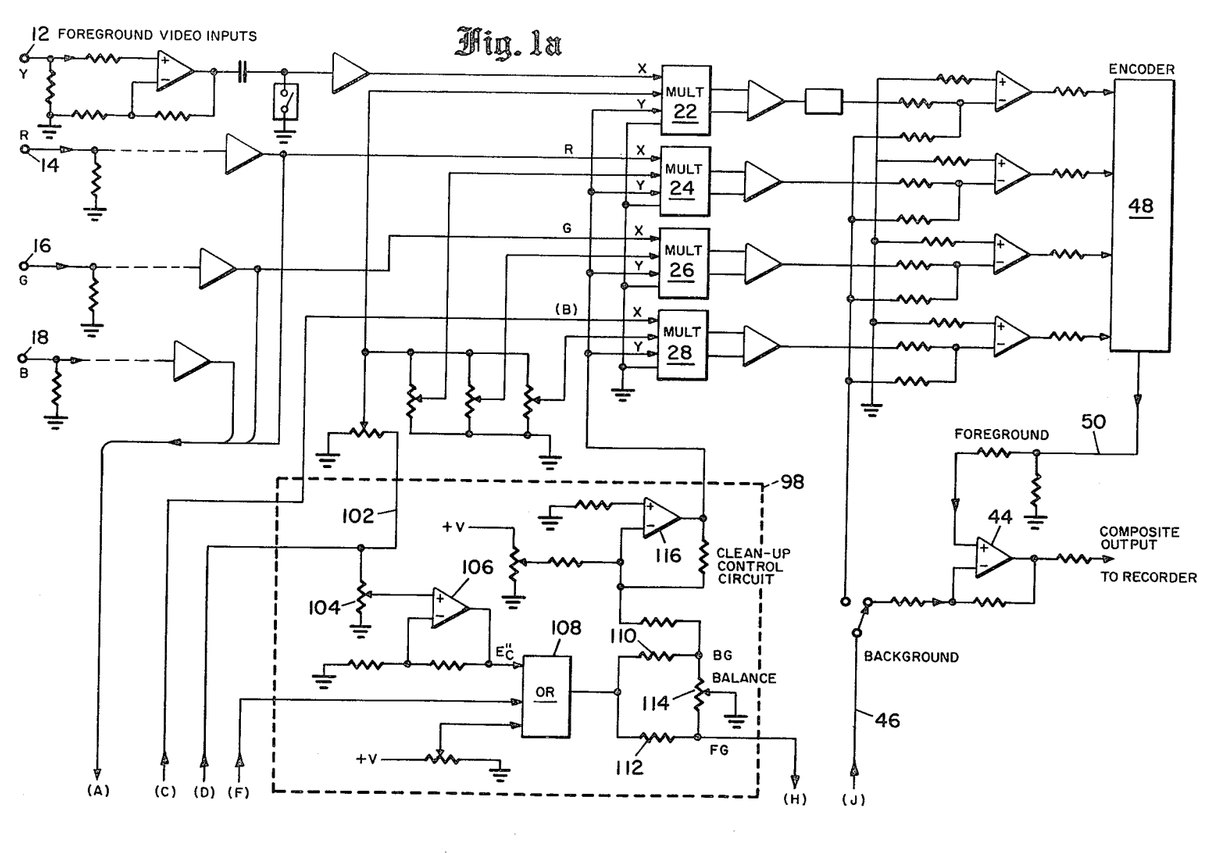
FIGS. 1a and 1b together form an overall block diagram illustrating the principles of the present comprehensive electronic compositing circuitry.
Figure 1B:
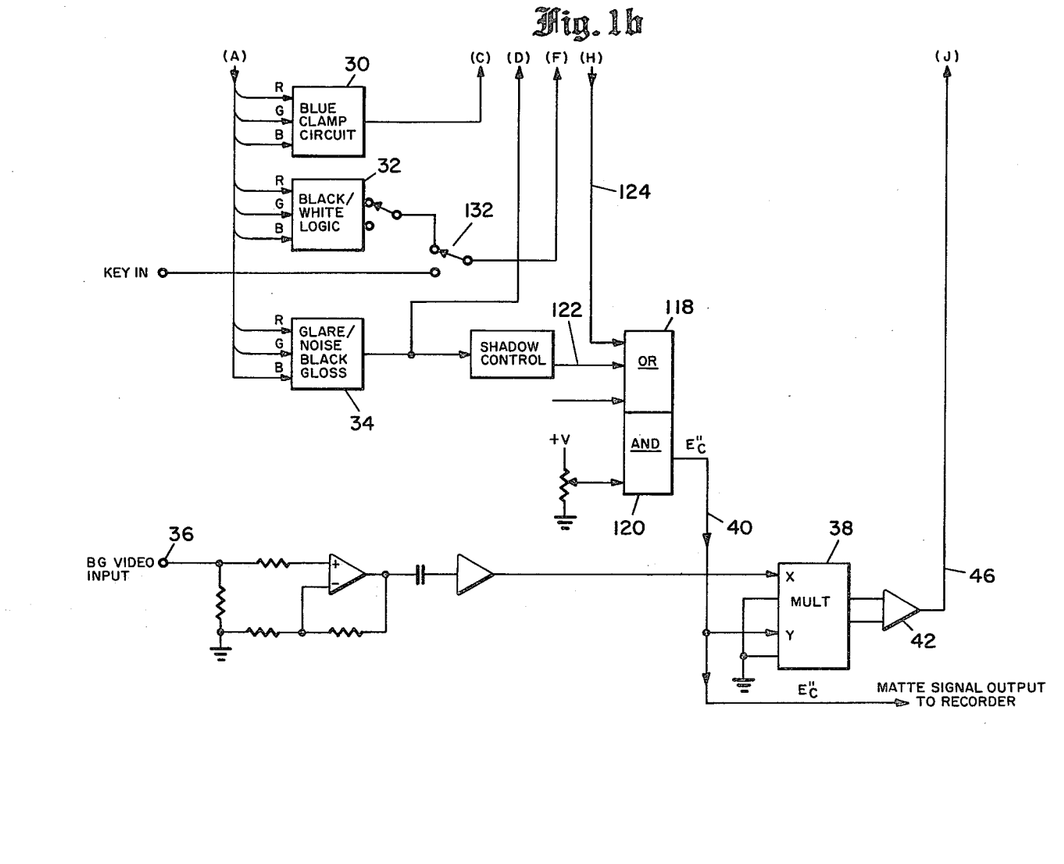

Now, referring to FIG. 1, including FIG. 1a on one sheet and FIG. 1b on another, the foreground input signals appear at terminals 12, 14, 16 and 18, with the letters R, G, and B at terminals 14, 16 and 18 referring to the instantaneous value of the red, green, and blue video foreground signals. The upper channel designated Y may be the luminence or contour signal, depending on the system which is employed. The input stage for the Y channel has been shown substantially completely; and the R,G,B stages are identical and are indicated be dashed lines. The four foreground input video signals are amplified and are supplied to the control multipliers 22, 24, 26 and 28, as well as to the blue clamp circuitry 30 (FIG. 1b) and to the black/white logic circuitry 32 (FIG. 1b). The red, green and blue video signals are also applied to the black gloss and the glare/noise circuit 34 (FIG. 1b) which will be described in detail in connection with FIG. 2 of the drawings.

Incidentally, the letters A, C, D, F, H and J are employed to match the leads extending between FIG. 1a on one sheet of the drawings and FIG. 1b on another, with the letters "B," "E" and "G" being used for other designations herein.

The background video signal is supplied to the system at terminal 36. It is amplified and applied to the "X" input terminal of the multiplier 38. A background control voltage $E_c$ is supplied on lead 40 to the "Y" input of the multiplier 38. The output from the multiplier 38 and differential amplifier 42 is combined with the foreground video signals in the mixer amplifier 44.

When the background control signal on lead 40 drops to zero, the output from the multiplier 38 is zero, and no background video signals are supplied over lead 46 to the amplifier 44. The maximum value of the background control signal on lead 40 is established by the potentiometer feeding AND gate 120. When the background control signal reaches this value, the selected maximum level of the background video is supplied from multiplier 38 through amplifier 42 along line 46 to the combining amplifier 44, and a full level of background picture appears at this area in the composite picture.

In my prior patent application cited hereinabove, the red, blue, and green background signals were processed individually, and such individual processing could also be accomplished here; however, it is simpler and less expensive to employ the encoded background video signal provided by all video cameras, tape recorders and video film chains, and to have this input signal supplied at lead 36. A similar encoding function for the matted foreground scene is accomplished by the encoder 48 which appears at the upper right-hand portion of FIG. 1, and the resultant composite video signal is supplied on lead 50 to the combining amplifier 44. Incidentially, a "matted" signal is one where the blue color of the blue backing has been removed.

Figure 2:
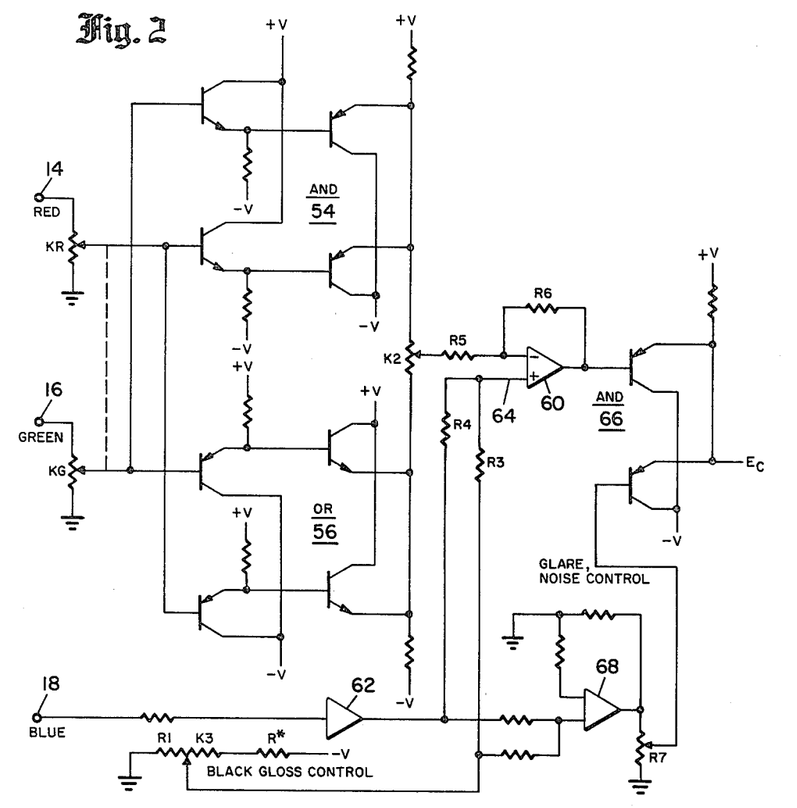
FIG. 2 is the sub-circuitry relating to black gloss control, and glare/noise control.

Now that the overall organization of the circuit of FIG. 1 has been noted, the circuitry 34 providing the black gloss compensation and the glare/noise correction will be considered, as these are the basic circuits which provide the background control signal, which is the critical function in the present invention. These circuits are shown in FIG. 2, to which reference will now be made. The remainder of FIG. 1 will be discussed hereinbelow.

Initially, it is noted that the values in equation form for the blue clamping level, or the maximum value for the color in the foreground which is also used for the backing screen, was set forth in some detail in my prior patent cited above. These functions are still implemented substantially identically by the prior circuit which is schematically shown as being included in block 30 of FIG. 1.

Now, as set forth in the prior patent, U.S. Pat. No. 4,100,569, on column 4, in Formula (8), the background video control signal may be expressed or defined as follows:

$$E_c = K_1\{B - [K_2(K_R R \text{ OR } K_G G) + (1-K_2)(K_R R \text{ AND } K_G G)]\} \quad (1)$$

Where $K_1$, $K_R$ and $K_G$ are constants which may be implemented by potentiometers, B is the blue foreground video, and $K_2$ is a constant implemented by a potentiometer which selects between and combines the two terms including R and G, the foreground red and green video signals. The designation "OR" in the above function indicates that the higher of $K_R R$ and $K_G G$ is selected; while the designation "AND" in the foregoing function indicates that the lesser or the lower of $K_G G$ and $K_R R$ is selected.

Now, shifting from the foregoing formula for the moment, consideration will be given to the problem of black glossy objects. A problem that plagues any compositing system capable of reproducing and transferring shadows from the "blue screen" backing to the background scene, is the problem of dark glossy objects. Such objects have no color of their own, and being glossy, will reflect the blue of the blue backing at some intensity less than the full brightness of the backing. By definition, a shadow is an area of the blue backing that is not at full brightness because the object creating the shadow, partially obscures the illumination of the backing. However, since the turn-on of the background scene is proportional to the brightness of the blue backing, the dark opaque, glossy object behaves as though it were a shadow. In the composite, the background scene is reduced in intensity, but "bleeds" through the object as though it were transparent.

The solutions to this problem up to the present time have been generally to spray paint the object with a dulling wax to dull its gloss.

This long-standing problem is solved in accordance with one aspect of the present invention by an electronic circuit which reduces the background control voltage $E_c$ to 0 if B is relatively low. This is accomplished by the use of a modified equation as follows:

$$E_c = K_1\{B' - [K_2(K_R R \text{ OR } K_G G) + (1-K_2)(K_R R \text{ AND } K_G G) - K_3(1-B)]\} \quad (2)$$

However, if B is equal to 1 (full intensity), the function as listed in Equation (1) hereinabove is fully operative.

Now, the manner of implementing this function is shown in FIG. 2 of the drawings. More specifically, the input terminals 14, 16 and 18 for the red, green and blue signals appear at the left in FIG. 2, and the potentiometers $K_R$ and $K_G$ which control the magnitude of the signal which represents red and green, when these signals are present, are also so labeled. Toward the top of FIG. 2 is a linear AND gate 54, and immediately below the AND gate 54 is a linear OR gate 56. Coupling the output of the AND and the OR gates is the potentiometer designated $K_2$. In formula (2) as set forth hereinabove, the constant $K_2$ appears twice, both as a direct factor $K_2$ applicable to the output from the OR gate function and as a factor $(1-K_2)$ as applicable to the output from the AND gate function. The value of $K_2$ is determined by shifting the wiper arm on the potentiometer $K_2$ as shown in FIG. 2 up or down, thereby combining the two functions as desired. The output from potentiometer $K_2$ is applied to the negative input of the amplifier 60.

Now, the circuitry which controls the introduction of the blue level will be considered. The blue information from amplifier 62 is connected to the other input of the operational amplifier 60 by the resistor R4. The black gloss control includes potentiometer R1 between ground and the minus 12 volt supply, with the potentiometer wiper arm being connected through resistor R3 to the common input terminal 64 to the positive input of operational amplifier 60. When the wiper of potentiometer R1 is at ground potential, R4/R3 provides a dividing network, and if R3 and R4 are equal, the voltage delivered to the operational amplifier 60 is cut in half. In operational amplifier 60, the gain at the negative input is R6 over R5. When R6 and R5 are equal, the gain is 1.0. The gain at the positive input, however, is 1+R6/R5. When R5 and R6 are equal, the positive gain is 2.0. But since R4 equals R3, the net gain for the blue information leaving amplifier 60 is also 1.0. Thus, operational amplifier 60 delivers to AND gate 66 the following function:

$$E_c = B - f(G/R) \quad (3)$$

If B equals f(G/R), then, $E_c$ will be zero. This is the condition for all grey scale objects. However, for a black object reflecting dimly the blue backing, red and green are at or near zero, while blue is somewhere between 5 percent and 30 percent, depending on the glossiness and the angle of the black surface. In unobstructed areas of the blue backing, red and green are again near zero, but blue is at 100 percent. Thus, $E_c$ equals 1 for unobstructed areas, and $E_c$ equals 0.05 to 0.03 for black glossy objects, in the absence of the supplemental circuitry disclosed herein. To retain full opacity, $E_c$, the signal that controls the background level, must be zero for such objects, but must remain 1.0 for unobstructed areas of the backing. The control R1 when moved to the right introduces a negative voltage to operational amplifier 60 and will reduce $E_c$ to zero in the areas occupied by the black glossy objects. Note, however, that R1 not only introduces a negative voltage to operational amplifier 60, it also becomes part of the voltage divider from the output of amplifier 62. Thus, the ratio of (R3+R1)/R4 increases as R1 increases.

When the backing is unobstructed, and blue from amplifier 62 is 1.0, the reduction of voltage on the positive input to amplifier 60 caused by potentiometer R1 feeding in a portion of the negative 12 volt supply is matched by an increase in voltage to the positive input to amplifier 60 by the ratio change of (R3+R1)/R4. Thus, for unobstructed areas of the blue backing, the $E_c$ of 1.0 if unaffected by the operation of R1 provided a suitable ratio has been chosen for R1/R*. Such a suitable ratio is about 1/10, when R4/R3 equals 1.0.

In any area when blue is substantially less than 1.0 (i.e. glossy black objects), the gloss control potentiometer R1 reduces $E_c$ to zero and thus eliminates the apparent transparency of fully opaque dark glossy objects. Any operational amplifier having suitable frequency response (such as the Harris HA2625-5) is suitable for amplifiers 60 and 68, for example.

Figure 3:
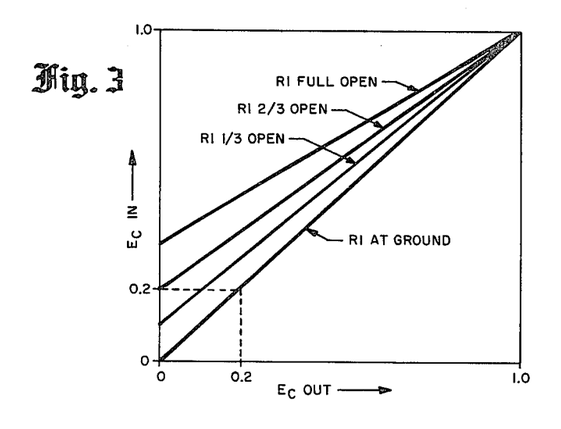
FIG. 3 is a set of graphs showing the mode of operation of certain portions of FIG. 3.

FIG. 3 is a diagram comparing the background control voltage, which would have been obtained with Equation (1), designated "$E_c$ in", plotted against the background control voltage obtained by Equation (2), designated "$E_c$ out" for varying values of the potentiometer R1. As indicated in FIG. 3 the value of the background control voltage ranges from zero, at which no background picture elements are introduced up to 1.0 where full background picture level is provided. With the tap on potentiometer R1 at ground over to the far left as shown in FIG. 2, the two characteristics are identical with the potentiometer R1 and resistor R* having substantially no effect. On the other hand, with R1 being fully inserted into the circuit, or fully open, then the black glossy object could provide up to about 30 percent reflection from the blue screen, and still appear to be fully opaque on the final picture. Certain intermediate levels are also shown in FIG. 3. The circuit of FIG. 2 has the incidental adverse effect that certain types of objects which are nearly opaque would appear to be entirely opaque, therefore losing some gradations of transparency. Accordingly, when there are no black glossy objects in the foreground scene, the potentiometer R1 may be set to ground, and a full range of transparencies is present in the composite picture.

A special problem arises when the foreground scene is back-lit with shadows falling toward the camera. Such lighting effects are sometimes required to achieve special effects and to match the angle of the sunlight in the background scene, for example. When the standard equation is employed in these circumstances, a very noisy signal may result, and shadow inversion may occur. Included in the circuit of FIG. 2 is a special circuit for eliminating these problems.

The basic equation for the control of the level of the background scene, as defined in equation (1) and (2), includes numerous terms. Each of the terms is needed to effect an intelligent control logic. As is well known in communication theory, the subtraction of two terms $(A+N_1)-(B+N_2)$ will result in a lower number when the two signal terms A and B are coherent (in phase). Random noise $N_1$ and $N_2$, however, does not subtract. If A and B are equal in-phase signals, with equal noise components, the signal will reduce to zero, while the random noise will add to 1.4 N. A noisy control signal, $E_c$ will result when a foreground scene with a blue floor is back-lit with shadows falling toward the camera. In this situation, the blue surface is at or near a mirror angle. The first surface of the blue paint will reflect a white-light glare-component in addition to the blue of the blue floor. The basic Equation No. (2) set forth above will require a very large constant factor $K_1$ when there is a large green component in this equation. Noise will then increase by $K_1$ (1.4 N). If the magnitude of the blue which is present is equal to 0.7 and F(G/R) equals 0.5, then B-f(G/R) equals 0.2 and $K_1$ must be equal to 5.0 for the background control signal $E_c$ to be equal to 1.0. Noise is thus increased by 5(1.4 N), or about 17 decibels. If the background signal $E_c$ were generated as a function of the level of the blue color alone, the noise figure would be 1.4 N, or an increase of 3 decibels, instead of 17 decibels. The background control signal generated by the blue signal alone would be 14 decibels quieter than that provided by the full equation, using the above exemplary numbers.

The full background control equation is needed in those parts of the scene occupied by the foreground subjects. However, in the blue backing area free of subjects, the blue signal is at full strength, while the red and green are near zero because the backing is (by specification) a high quality blue. Thus, the equation $E_c$ equals K(B) would be fully adequate for the control of the background scene level throughout all non-obscured regions of backing (including shadow areas). Thus, two control signals are operative, with the full multi-term equation being used in areas occupied by foreground subjects and the simple equation which is merely a function of the level of blue, in all other areas of the backing. This dual control signal provides for remarkable improvement in picture quality when it is necessary to back-light the subject, thus creating glare light.

The circuitry that determines which of the two control signals will be operative in any given region of the scene is the linear AND gate 66, and the control potentiometer R7 at the output from the amplifier 68 supplying the blue signal level. In operation, the control potentiometer R7 is adjusted until the input to the AND gate 66 from amplifier 68 is slightly less than the input received from amplifier 60, which provides the full multi-term background control function. It is a property of the linear AND gate 66 that only the lower of the inputs will be delivered to its output.

A control signal derived by the simpler equation of $E_c=KB$ will produce a lower background control signal in the shadow area, since in the example discussed above, B may have a level equal to 0.6 in the shadow area as compared with 0.7 in the glare area. Accordingly, circuit of FIG. 2 not only vastly reduces noise due to glare light, it also prevents inversion of shadows.

Now, referring to shadow control, FIGS. 4 and 5 will be discussed below. My earlier U.S. Pat. No. 4,100,569 shows a technique for increasing shadow density. It developed that the method of operation was not easily learned by an operator in view of the interaction between the controls. A simplified one-knob shadow control will be described below in connection with FIGS. 4 and 5. It requires no significant learning time, and also provides the additional function of making shadows lighter, as well as darker.

By definition, a shadow on the blue backing of a "bluescreen" foreground scene causes the blue level to drop below the general uniform level of the backing. If the general level is assumed to be unity, a medium density shadow, could have a blue level of about 0.5, for example. Since a unity background control signal provides for full turn-on of the background scene when the backing is fully illuminated, the control signal for a half-illuminated shadow will normally be 0.5, and will provide turn-on of the background scene to one-half level. To intensify the shadow, the background control voltage must be reduced to a lower value. To lighten the shadow, the background control voltage $E_c$ must be increased to a higher value.

Figure 4:
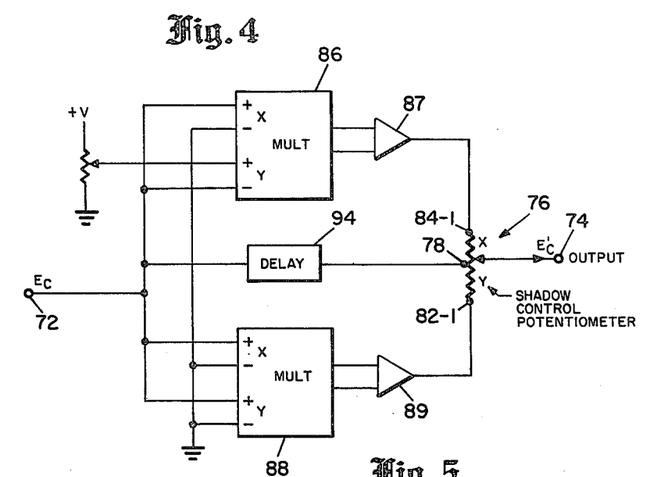
FIG. 4 is a circuit diagram showing the shadow control circuitry.

In FIG. 4 the input at terminal 72 is designated $E_c$ and the output at terminal 74 connected to the wiper arm of potentiometer 76, is designated $E_c'$. When the wiper arm of potentiometer 76 is immediately opposite or in engagement with terminal 78, there is no modification of the input background control signal, and the output background control signal is identical with the input.

Figure 5:
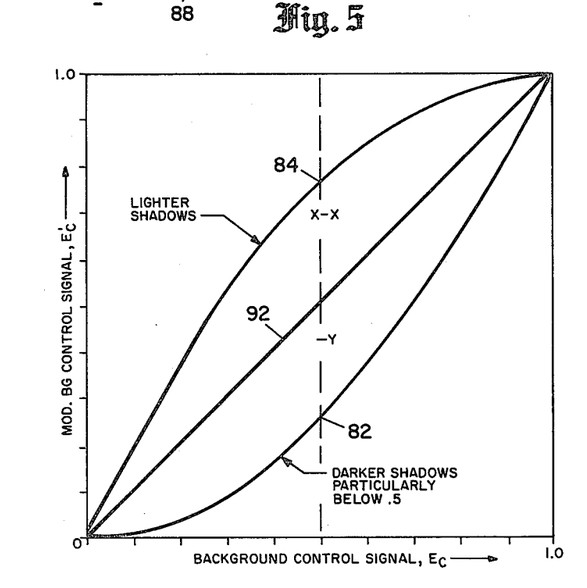
FIG. 5 is a set of plots indicating the mode of operation of the circuit of FIG. 4.

The circuit of FIG. 4 provides the curves of FIG. 5, with the input background control signal $E_c$ being plotted along the horizontal in the graph, and the modified background control signal $E_c'$ being plotted on the vertical axis of the plot of FIG. 5. Note that a natural shadow producing a background control voltage of 0.5 along the X-axis can be made to produce a new background control signal varying anywhere from approximately 0.25, as indicated by point 82 in FIG. 5, up to 0.75, as indicated by point 84, thus darkening or lightening the shadow. This action is achieved in the circuit of FIG. 4 by moving the wiper arm of the potentiometer 76 from its initial central point opposite terminal 78 to position 84-1 to lighten the shadow or to position 82-1 to darken the shadows. The circuit of FIG. 4 is uniquely applicable to shadow control because the upper half of the circuit employing multiplier 86 and amplifier 87 produces not simply the square root of the input background control signal but rather the function $E_c(K-E_c)$. This function produces a curve where the background control signal is relatively high (equal to 0.91 or above), for all values of the background control signal above 0.7. This curve shape is especially useful where it is desired to eliminate shadows. It is relatively easy for the lighting director to fill shadow areas to an illumination level of 70 percent or more. With the background control signal at 0.7, and control potentiometer 76 at position 84-1, this circuit will raise the background control signal to 0.91. Only a small additional level change is then needed to bring the background control signal up to unity for full turn-on of the background scene. This action eliminates the shadow.

The lower portion of the circuit of FIG. 4, including multiplier 88 simply squares the input background control signal to produce the lower curve as shown in FIG. 5. This curve is especially effective in the enhancement of the intended shadows which usually have a background control voltage of 0.7 or less.

It may be noted again that the control potentiometer 76 may be varied to any curved position between the limits of $E_c^2$ and $E_c(K-E_c)$ as shown in FIGS. 4 and 5. With the output wiper arm of potentiometer 76 in its center position, the input background control signal passes directly to output terminal 74, and all elements of the shadow circuitry are by-passed. The central linear plot 92 in FIG. 5 is produced with the potentiometer control in this position. An important feature of this shadow control circuit is that it has no effect upon the scene except in ths shadow areas. This results from the fact that the background control signal is unaffected when it has a value of zero or unity.

It may also be noted that the shadow control circuit of FIG. 4 includes the delay line 94 to match the delay provided by the multiplier and amplifier circuit 86 and 87, and 88 and 89. This delay line 94 assures equal time of arrival for signal following each of the three possible paths through the shadow control circuit and combinations thereof.

The next circuit to be considered is what has been referred to as the "clean-up" circuit, and this is included within the dashed line block 98 of FIG. 1.

By way of background, it was observed that, in normal video production employing a blue floor, in a bluescreen background process, that by mid-day the blue floor was either scuffed, burnished, or showed footprints from normal foot traffic. The compositing system as described in my prior U.S. Pat. No. 4,100,569, cited above, is a linear system that shows every variation of brightness of the blue backing, including the floor, and also all levels of transparent subject such as thin layers of dust. Foot marks on the floor, as well as thin dust layers are reproduced and represent imperfections in the composite video image. The normal solution to this problem is to mop and/or repaint the floor. Production is delayed for the time it takes the new paint to dry.

Scuff marks on the floor are exhibited as a slight loss of blue brightness. A thin layer of dust does not obliterate the blue floor, but it does act as a thin almost-transparent, non-blue substance. Because dust has its own color, it acts as a transparent substance since the blue floor may still be seen through the dust. As noted above, with the linear system as described in my prior patent cited above, the scuff marks and the dust layer are included in the composite picture.

The circuit 98 as included in FIG. 1 takes a portion of the background control signal on lead 102 by means of the potentiometer 104, amplifies this portion of the background control signal in amplifier 106 and applies it to one of the inputs, the "Y" input, of the foreground output multiplier 22, 24, 26 and 28, and also to the "Y" input of the background multiplier 38. The system then composites and reproduces all levels of shadow and all levels of transparency up to the selected clean-up level, which might for example, be in the order of 80 percent transparent. Above the selected level, the shadow or scuff mark is not reproduced. Above this selected level the semi-transparency object is made fully transparent and is not reproduced. This permits the elimination of the footprints and dust, as mentioned above, and also of thin wires which may be used for support and which should not be included in the final composited picture.

Referring back to FIG. 1a, at the output from amplifier 106, the portion of the background control signal $E_c$ is amplified to a value of 1.0. This amplified signal is called the clean-up signal, $E_c''$. It is fed through the OR gate 108 to the balance control circuit including the input resistors 110 and 112 and the balance control potentiometer 114. The upper end of the balance control potentiometer 114 is connected to inverting amplifier 116 and then to control the foreground video multipliers 22, 24, 26 and 28, while the lower point of the balance control circuit is connected to OR gate 118 (FIG. 1b) and through AND gate 120 to turn the background signal on full strength when it approaches this level.

The fact that a dusty footprint has been tracked onto the blue floor will cause a reduction of blue light and an increase in red and green. It also results in a control signal which would normally be slightly less than 1.0. Since full turn-on set by the AND gate 120 is 1.0, then $E_c'$ from the shadow control circuit will not quite turn on the background to full clip level in the footprint area through the normal entry at lead 122. The clean-up signal $E_c''$ also has access to the AND gate circuit 120 through OR gate 118, at input terminal 124, and will fully turn on the background signal, thus eliminating the darkening of the background scene in the area where the footprint was present.

A tracked-in footprint also leaves a layer of dust. Even though it is very transparent, it still has a video level a little greater than zero. The 1.0 volt clean-up signal is also routed by the balance control to amplifier 116 and to the multipliers for the foreground video as mentioned above. The amplifier 116 normally provides a +1.0 volt to the "Y" input of the foreground multipliers 22, 24, 26 and 28. However, the 1.0 volt clean-up signal from the balance control causes the output from amplifier 116 to drop to zero, thus shutting off these multipliers.

The clean-up signal is operative when the blue is just a little less than full intensity, and/or when the foreground scene is nearly clear. If there is absolutely nothing in the foreground, then there is no loss by shutting it off. However, if there is barely visible substance on the blue floor or wall, then it will be lost when the foreground multipliers are turned off. This is precisely what is desired when one wishes to "clean-up" a scuffed and slightly dirty floor. The clean-up circuit may also be used to eliminate such things as seams in the blue backing, wrinkles, folds, uneven illumination; and such foreground objects as fine support wires, unwanted dust or smoke and (almost) transparent support columns. The balance control potentiometer 114 proportions the clean-up signal to either only the background, only the foreground, equally to both foreground and background, and lastly, unequally to the foreground and background as determined by the position of the grounding potentiometer arm. The balance control is important in achieving a pleasing natural composite because this "best picture" tends to occur with the balance control a little off-center to compensate for the reflective nature of the substance being cleaned-up.

Figure 6:
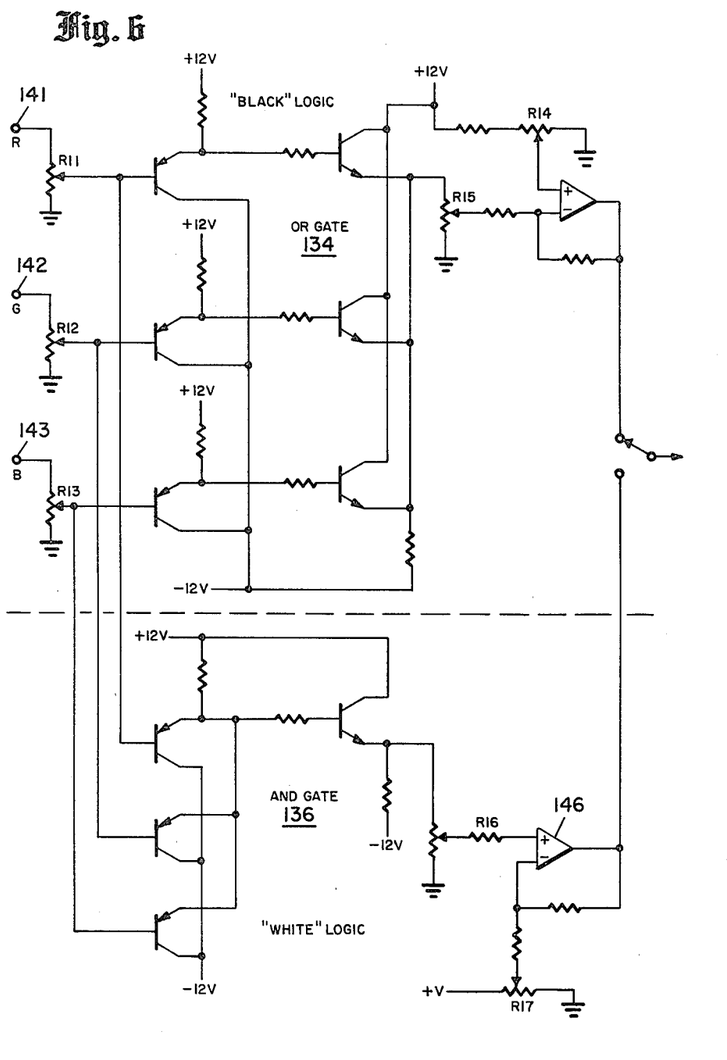
FIG. 6 is a schematic showing of the circuitry for implementing the "black logic" and the "white logic" useful for black backgrounds, and for the drawing of cartoons on white backgrounds, respectively.

Included in the overall circuit of FIG. 1 is the block 32 which is designated "black/white logic". FIG. 6 shows the details of this black and white logic circuitry which is employed for providing certain special effects using a black background, and for facilitating the compositing of foreground and background scenes using cartoons drawn on plain white paper. FIG. 6 which shows the details of the black/white logic will be discussed following some more generalized background.

With regard to the black logic circuitry, on occasion it is necessary to composite a multi-color foreground scene over a background scene. When the foreground scene contains all of the colors in the spectrum, such as the RCA color track logo, it is no longer possible to employ color as a means of separating the foreground from its backing. In such cases, luminence has been the traditional criterion for setting up a switching signal. Luminence, however, is a unique function of color and is made up of 59% green, 30% red, and 11% blue. Threshhold controls must therefore be set to switch at some value less than 11% if blue is one of the colors to be composited. A switching signal based on luminence is a yes/no decision as in any switch. Using such a system, it is not possible to composite streak photography, where the streaks are presumed to be transparent. Such transparency requires a linear proportional system where the visibility of the background scene is proportional to the transparency of the original foreground, or expressed in other terms, the visibility of the background scene is inversely proportional to the percentage reflectance of the foreground color, not its luminence.

If one illuminates a white surface with white light (5500 degrees Kelvin) then all wavelengths are reflected at equal intensity. However, if one selects a number of paints or pigments, such as red, green, blue, cyan, magenta, and yellow, the reflectance of these colors are not likely to be equal because various pigments differ in their percentage reflectivity within the spectral range defined by that color. The following explanation of FIG. 6 will show that streak trails (diminished reflectivity) of colored objects having unequal reflectivity can be made equally transparent by adjusting the individual input levels of red, green and blue.

It is assumed that a series of colors are photographed against a black backing with an open shutter, and that the camera is then pulled back rapidly to create a streak in the film. The streak, of course, is of a lower intensity than the character that formed it. The film exhibiting the streak photography is reproduced on a film-chain, such as the RCA, or Rank-Cintel. The film chain provides a standard red-green-blue video signal identical to that of a video camera. This red-green-blue or RGB video is connected to the red, green, and blue inputs, respectively, of the upper black logic circuit of FIG. 6. The output of the black logic circuit is connected to the input switch 132 as shown toward the center and somewhat to the left in FIG. 1b. The balance control potentiometer 114 is turned fully toward background (upper position) so as to affect only the background scene.

The fact that a color such as blue might not be as reflective as a red color, is a natural property of the pigment. Thus, the RGB values for relatively common pigment might show a reflectivity for red of about 90%, for green of about 70%, and for blue of about 60%. Thus, the "normalized" values of 0.90, 0.70 and 0.60 will be provided to the RGB inputs of FIG. 6, by the input potentiometers. In video terms these values would be referred to as 90 units, 70 units, and 60 units.

In normal operation, the three control potentiometers R11, R12 and R13 would be fully "on", with R15 off, or at ground potential. R14 is then advanced until the background scene is turned fully "on", with the control at 1.0 volts. The video output of all foreground channels will be the actual scene on the foreground film and will be present at the output of the mixer 48 in FIG. 1. The background scene will also be present and superimposed over the foreground scene. As control R15 of FIG. 6 is advanced, the red subject will become opaque first, because its reflectance was at 90 units. As R5 is further advanced, the green subject at 70 units will become opaque, and then on further advancement, the blue subject will become opaque. The streak following the blue subject will be properly transparent if R5 is left in that position when blue was just opaque. The green and red colors will not have equally transparent streaks because they exhibited a higher reflectance, 70 and 90, respectively. By reducing the red and green levels by means of R11 and R12 in FIG. 6, the same level of transparency can be obtained for red and green, as was established for blue, and these adjustments establish the "normalized" input levels for the three colors.

Summarizing, R15, together with R11, R12 and R13 determine the reflectance level in video units at which a given color becomes opaque. Below that level, the color becomes progressively and linearly more transparent as reflectivity in video units approaches zero. Incidentally, as discussed above, the linear OR gate 134 accepts red, green, and blue levels, but its output will be whichever is the greater at any given instant.

The lower half of the circuit of FIG. 6 relating to "white logic" or to cartoons drawn on white paper, will now be discussed.

It is customary for cartoon artists to produce black outlines of the cartoon character on a clear, plastic sheet called a cell. This clear transparent cell is then hand-painted with opaque colored paints to produce the cartoon character. One or more colored cells are then placed over the background drawing and photographed to produce the composite scene.

A method is described here whereby the cartoon can be drawn on ordinary white paper and colored with water colors. This procedure is much faster and less expensive than using the clear plastic sheeting. In accordance with the present method, one video camera observes the background scene. A second video camera observes the cartoon character drawn and colored on white paper and its output is connected to the RGB inputs 141, 142 and 143 of FIG. 6.

Although white paper is supposed to be white and therefore equally reflective to red, green, and blue, so-called white paper can have various shades of white in which the red, green, and blue may differ by as much as 5% or so and still be called white. The input controls R11, R12, and R13 may be adjusted to provide exactly equal levels into these inputs of the AND gate 136, and thereby "normalize" the inputs, to the particular paper which is being used.

The potentiometers R16 and R17 provide sensitivity control. That is, they determine how much deviation from white must occur before the area is recognized as an opaque foreground subject. If the amplifier 146, for example, has a gain of 10, then by setting R16 at maximum and R17 to provide unity level output from amplifier 146, the drop of any color, red, green or blue, by as much as 10 units will cause the amplifier 146 output to drop to zero, thus turning off the background scene (because a subject is present) and turning on the foreground scene. A 10% drop in any one color represents a barely noticeable shift from white into one of the very light pastel colors. If an off-white paper is selected, then the color white may also be used in the cartoon itself.

If a true white paper is used, and white areas are needed in the cartoon, these areas may be painted a deep blue. If this video signal is then passed through the video matting device described in the prior U.S. Pat. No. 4,100,569 cited above, the blue may be dropped out and white substituted in its place.

In the white logic circuit of FIG. 6, in the AND gate 136, the lowest input signal appears at the output. Accordingly, when a pastel shade is scanned, at least one of the three inputs will drop significantly and this will reduce the control signal from amplifier 146 and turn the background off, and the foreground ON.

In conclusion, in the present improved comprehensive electronic compositing system, several techniques have been disclosed for advantageously utilizing a non-linear background control signal in place of the conventional linear background control signal, or a mixed combination of linear/non-linear, to achieve special improved effect, or to overcome certain recurring problems. It is to be understood that other similar non-linear circuits could also be employed within the scope of the present invention. It is also to be particularly noted that the various individual specific circuits which have been disclosed herein may be employed either in combination with one another, or separately, to achieve the desired special effects or purposes. Although analog AND and OR gates together with linear operational amplifiers are used to perform the physical function of addition, substraction, and multiplication as called for in the equations and description, one may convert the R.G.B. signals immediately into digital values and perform all of the specified operations using digital devices to add, subtract, multiply and compare. Having completed the processing the R.G.B. values in digital form may be connected back into an analog signal for recording or transmission. The scope of this invention is not restricted to any specific manner or performing the specified functions and may utilize any of the conventional techniques for achieving addition, substraction, multiplication and comparison.

What is claimed is:

1. An improved comprehensive electronic system for compositing foreground and background signals of the so-called "blue-screen type" wherein the foreground signals are formed against a uniform color background comprising:

a source of red, green, and blue foreground signals;

a source of background signals;

means for developing a basic varying background control signal for varying the intensity of the background signal, including intermediate levels of background signals for use in the case of transparent foreground objects and the edges of rapidly moving foreground objects, including means for varying said basic background control signal substantially linearly as a function of the red, green and blue foreground signals in accordance with the transparency of said foreground objects;

means modifying said basic linear background control signal into a significantly non-linear modified background control signal; said modifying means including means for producing a clean-up signal by amplifying the basic background control signal and raising it to full intensity in areas approaching and close to full transparency, and concurrently reducing the intensity of the foreground signals in these areas, whereby semi-transparent objects are made fully transparent at such levels, and dust, footprints and the like on the uniform color background of the foreground scene are eliminated;

means for controlling the intensity of the background picture elements in accordance with said modified background control signal; and means for combining the resultant foreground and background signals to produce high quality composite images.

2. An improved comphrehensive electronic compositing system as defined in claim 1 further comprising means for selectively utilizing either the linear basic varying background control signal, or the modified non-linear background control signal.

3. An improved comprehensive electronic compositing system as defined in claim 1 including black gloss control circuit means for eliminating print-through of the background signal in the presence of dark glossy foreground objects by reducing the background control signal to zero when the level of the color in said uniform color background drops below a predetermined low value.

4. An improved comprehensive electronic compositing system as defined in claim 3, wherein the background control signal developing means includes the term $-K(1-E_c)$, where K is a constant and $E_c$ represents the linear basic background control signal, whereby the black gloss control signal does not affect the background control signal at high levels of the color in said uniform color background.

5. An improved comprehensive electronic compositing system as defined in claim 1 including circuit means for reducing the noise and glare effects caused by the back-lighting of foreground scenes by providing an alternate background control signal proportional to a linear function only of the color of said uniform color background, and means for transitioning over to said alternate background control signal in areas where there are no foreground objects present.

6. An improved comprehensive electronic compositing system as defined in claim 5 wherein said transitioning means is implemented by a linear AND gate.

7. An improved comprehensive electronic compositing system as defined in claim 5 wherein said basic and said alternate background control signals are both applied to said linear AND gate, and means are provided for utilizing said alternate background control signal for areas of said uniform color backing where no foreground objects are present.

8. An improved comprehensive electronic compositing system as defined in claim 1 including shadow control means for shifting said basic background control signal to a modified background control signal which is a power, such as the square, of the basic background control signal.

9. An improved comprehensive electronic compositing system as defined in claim 1 including shadow control means for shifting said basic background control signal to a function $E_c'$ of the basic control signal $E_c$ in the form $E_c' = E_c(K - E_c)$.

10. An improved comprehensive electronic compositing system as defined in claim 1 including a shadow control signal having three parallel paths, between input terminal means for receiving a basic background control signal and the movable arm of an output potentiometer, one of said parallel paths connecting said input terminal to a center tap on said output potentiometer with no modification of the basic background control signal, a second one of said parallel paths to one end of said potentiometer including means for lightening shadows by increasing the output background control signal significantly, and the third of said parallel paths to the other end of said potentiometer including means for darkening shadows by reducing the output background control signal significantly, whereby a signal control knob of said output potentiometer provides a continuous shadow control range.

11. An improved comprehensive electronic compositing system as defined in claim 1 including black background logic circuit means for developing a background control signal which is proportional to the highest of the three normalized foreground colors and becomes effective at predetermined intensity levels.

12. An improved comprehensive electronic compositing system as defined in claim 11 wherein said logic circuit means includes a linear OR gate.

13. An improved comprehensive electronic compositing system as defined in claim 1 including white-background logic circuit means for developing a background and foreground control signal which is proportional to the lowest of the three normalized foreground colors and becomes effective at predetermined intensity levels, whereby conventional white paper background may be employed for cartoon preparation or other subjects photographed against a white background.

14. An improved comprehensive electronic compositing system as defined in claim 13 wherein said logic circuit means includes a linear AND gate.

15. An improved comprehensive electronic compositing system as defined in claim 1 further comprising balance control means for increasing the application of said clean-up signal to reduce the foreground signal while reducing its applicability to turn on the background signal, and vice versa, whereby the background turn-on and the foreground turn-off signals may be made equal or unequal to the point where only one of the two scenes is affected.

16. An improved comprehensive electronic system for compositing foreground and background signals of the so-called "blue-screen" type wherein the foreground signals are formed against a uniform color background, comprising:
a source of red, green, and blue foreground signals;
a source of background signals;
means for developing a basic varying background control signal for varying the intensity of the background signal, including intermediate levels of background signals for use in the case of transparent foreground objects and the edges of rapidly moving foreground objects, including means for varying said basic background control signal substantially linearly as a function of the red, green and blue foreground signals, in accordance with the transparency of said foreground objects; and
means for modifying said basic linear background control signal into a significantly non-linear modified background control signal; and
means for controlling the intensity of the background picture elements in accordance with said non-linear modified background control signal; and means for combining the resultant foreground and background signals to produce high quality composite images.

17. An improved comprehensive electronic compositing system as defined in claim 1 including means for amplifying the basic background control signal and raising it to full intensity in areas approaching and close to full transparency, and concurrently reducing the intensity of the foreground signals in these areas, whereby semi-transparent objects are made fully transparent at such levels, and dust, footprints and the like on the uniform color background of the foreground scene are eliminated.

18. An improved comprehensive electronic compositing system as defined in claim 16 further comprising means for selectively utilizing either the linear basic varying background control signal, or the modified non-linear background control signal.

19. An improved comprehensive electronic compositing system as defined in claim 16 including black gloss control circuit means for eliminating print-through of the background signal in the presence of glossy foreground objects by reducing the background control signal to zero when the level of the color in said uniform color background drops below a predetermined low value.

20. An improved comprehensive electronic compositing system as defined in claim 19 wherein the background control signal developing means includes the term $-K(1-E_c)$, where K is a constant and $E_c$ represents the linear basic background control signal, whereby the black gloss control signal does not affect the background control signal at high levels of the color in said uniform color background.

21. An improved comprehensive electronic compositing system as defined in claim 16 including circuit means for reducing the noise and glare effects caused by the back-lighting of foreground scenes by providing an alternate background control signal proportional to a linear function only of the color of said uniform color background, and means for transitioning to said alternate background control signal in areas where there are no foreground objects present.

22. An improved comprehensive electronic compositing system as defined in claim 21 wherein said transitioning means is implemented by a linear AND gate.

23. An improved comprehensive electronic compositing system as defined in claim 21 wherein said basic and said alternate background control signals are both applied to said linear AND gate, and means are provided for reducing said alternate background control signal to a slightly lower level than said basic background control signal, for areas of said back-lit background where there are no foreground objects present.

24. An improved comprehensive electronic compositing system as defined in claim 16 including shadow control means for shifting said basic background control signal to a modified background control signal which is a power, such as the square, of the basic background control signal.

25. An improved comprehensive electronic compositing system as defined in claim 16 including shadow control means for shifting said basic background control signal to a function $E_c'$ of the basic control signal $E_c$ in the form $E_c' = E_c(K - E_c)$.

26. An improved comprehensive electronic compositing system as defined in claim 16 including a shadow control signal having three parallel paths, between input terminal means for receiving a basic background control signal and the movable arm of an output potentiometer, one of said parallel paths connecting said input terminal to a center tap on said output potentiometer with no modification of the basic background control signal, a second one of said parallel paths to one end of said potentiometer including means for lightening shadows by increasing the output background control signal significantly, and the third of said parallel paths to the other end of said potentiometer including means for darkening shadows by reducing the output background control signal significantly, whereby a single control knob of said output potentiometer provides a continuous shadow control range.

27. An improved comprehensive electronic compositing system as defined in claim 16 including black background logic circuit means for developing a background control signal which is proportional to the highest of the three normalized foreground colors and becomes effective at predetermined intensity levels.

28. An improved comprehensive electronic compositing system as defined in claim 27 wherein said logic circuit means includes a linear OR gate.

29. An improved comprehensive electronic compositing system as defined in claim 16 including white background logic circuit means for developing a background and foreground control signal which is proportional to the lowest of the three normalized foreground colors and becomes effective at predetermined intensity levels, whereby conventional white paper may be employed for cartoon preparation and a white backing may be used for normal subjects.

30. An improved comprehensive electronic compositing system as defined in claim 29 wherein said logic circuit means includes a linear AND gate.

31. An improved comprehensive electronic compositing system as defined in claim 16 further comprising balance control means for increasing the application of said clean-up signal to reduce the foreground signal while reducing its applicability to turn on the background signal, and vice versa, whereby the background turn-on and the foreground turn-off signals may be made equal or unequal to the point where only one of the two scenes is affected.

32. An improved comprehensive electronic compositing system as defined in claim 1 or claim 16 wherein said means for developing a basic linear varying background control signal includes means for developing the following function:

$$E_c = K_1\{B - [K_2(K_R R \text{ OR } K_G G + (1 - K_2)(K_R R \text{ AND } K_G G)]\}$$

Where $E_c$ is the linear background control signal, $K_1$ and $K_2$, $K_R$ and $K_G$ are constants, and B, R and G represent the level of three foreground color signals, with B representing the color of the uniform color background.

33. An improved comprehensive electronic compositing system as defined in claim 10 or claim 26, including means for precluding changes in the background control signal with any adjustment of said output potentiometer when the background is either fully off or fully on.

* * * * *